UNITED STATES PATENT OFFICE.

RICHARD J. FRISWELL, OF LONDON, ENGLAND, ASSIGNOR OF ONE-HALF TO THE BRITISH URALITE COMPANY, LIMITED, OF LONDON, ENGLAND.

MANUFACTURE OF REFRACTORY MATERIALS.

SPECIFICATION forming part of Letters Patent No. 686,672, dated November 12, 1901.

Application filed June 17, 1901. Serial No. 64,981. (No specimens.)

*To all whom it may concern:*

Be it known that I, RICHARD JOHN FRISWELL, a subject of the King of Great Britain, residing at London, England, have invented certain new and useful Improvements in the Manufacture of Refractory Materials, of which the following is a specification.

In the specification of Letters Patent No. 631,719 there is described a method of precipitating colloidal silica by the interaction of acid carbonates (bicarbonates) with alkaline silicates, which method is especially useful in the manufacture of refractory materials containing asbestos, silica, chalk, and like substances. The action above mentioned practically ceases by the equilibration of the chemical forces therein engaged when the bicarbonate has parted with about sixty per cent. of the molecules of $CO_2$, which are capable of entering into the reaction—that is to say, the reaction at this stage either ceases altogether or becomes so slow as not to be of any practical industrial value. It has therefore been necessary heretofore to remove the exhausted bicarbonate solutions and regenerate them by the addition of $CO_2$ as soon as the percentage of bicarbonate in the said solutions has fallen to about one-third of that originally present. This involves the use of complicated arrangements for the removal and replacement of the exhausted solutions or for the placing of the sheets of fabric or other bodies under treatment in fresh solutions of bicarbonate, which treatment must be repeated until all the silicate absorbed by the fabric has been decomposed. Now I have found that all these difficulties can be avoided by the continuous regeneration of the bicarbonate (usually bicarbonate of soda) employed during the treatment of the sheets or bodies. With this object I introduce into the tanks of bicarbonate solution in which the objects saturated with sodium silicate are treated perforated tubes or equivalent devices arranged in any convenient fashion, through which a continuous stream of $CO_2$ is made to issue into the bicarbonate solution, the rate of admission being so regulated that the $CO_2$ is completely absorbed and none allowed to escape and become waste. If the tanks are large, the solution is moved about by means of circulating-pumps, agitators, or other suitable devices and so brought within the sphere of action of the $CO_2$, or the circulating-pumps may force the fluid, drawn continuously from the tanks, through any convenient device by or in which it is brought into contact with carbonic-acid gas and from which it is thereafter returned to the tanks, the object in each case being to continually maintain the proportion of carbonic acid in the solution as nearly as possible constant and so as to correspond nearly or quite to that required by the formula $NaHCO_3$ by continuously regenerating the bicarbonate solution by means of carbonic-acid gas as fast as it is deprived of such gas by the action of the silicated sheets. The molecule of carbonate of soda arising from the sodium silicate by the disposable molecule of carbonic acid contained in the sodium bicarbonate passes into the solution; but the strength thereof in respect of the sodium salt can never exceed that point at which the carbonic acid introduced, as above described, begins to throw out sodium bicarbonate. The sodium bicarbonate so thrown out can be removed by fishing out or by forcing the solution containing it in suspension through filter-presses or by any of the devices well known to chemists and suitable for the purpose in view. From this sodium bicarbonate the carbonic acid may be expelled by heat, and it may then be used for the regenerating process, thus effecting an economy in the quantity of such gas required. The carbonate of soda obtained by this removal of carbonic-acid molecule can be used in the manufacture of sodium silicate by melting the same with sand, and the molecule of $CO_2$ expelled in this action may also be used in the regenerating process, so that ultimately the manufacture of the refractory material would be carried out with asbestos, chalk, sand, carbonate of soda, and carbonic acid alone, the two last being required only in such quantities as may be requisite to replace loss due to imperfections of apparatus and such like defects, since by this method carbonic acid would be generated partly from the bicarbonate fished out as above described and partly from the carbonate, and the soda of the silicate would be recovered by the use of the carbonic-acid, as above described, as sodium bicarbonate, and again applied to produce more silicate.

What I claim is—

1. A process for the production of refractory materials from asbestos, chalk and like substances by depositing blocks or sheets of said substances in a solution of a silicate, and then in a solution of a bicarbonate, which latter solution is at the same time continuously brought into contact with carbonic-acid gas for the purpose of regenerating the bicarbonate, substantially as described.

2. A process for the production of refractory materials from asbestos, chalk and like substances, and recovering by-products by depositing blocks or sheets of said substances in a solution of a silicate, and then in a solution of a bicarbonate, continuously regenerating the bicarbonate solution by means of carbonic-acid gas, removing the bicarbonate thrown out of the saturated solution, and heating the bicarbonate so removed to recover carbonic-acid gas therefrom, substantially as described.

3. A process for the production of refractory materials from asbestos, chalk and like substances and recovering by-products, by depositing blocks or sheets of said substances in a solution of a silicate, and then in a solution of a bicarbonate, continuously regenerating the bicarbonate solution by means of carbonic-acid gas, removing the bicarbonate thrown out of the saturated solution, heating the bicarbonate so removed to recover a portion of the carbonic-acid gas therefrom, and then melting the residue with sand to form sodium silicate and to recover the remaining carbonic-acid gas, both of which substances are used in the production of further quantities of refractory material, substantially as described.

4. A process for the production of refractory materials from asbestos, chalk and like substances, consisting in depositing blocks or sheets of said substances in a solution of a silicate, and then in a solution of a bicarbonate which is at the same time continuously circulated in contact with carbonic-acid gas, substantially as described.

In testimony whereof I have hereunto set my hand in presence of two subscribing witnesses.

R. J. FRISWELL.

Witnesses:
GEORGE HARRISON,
HERBERT A. BEESTON.